UNITED STATES PATENT OFFICE.

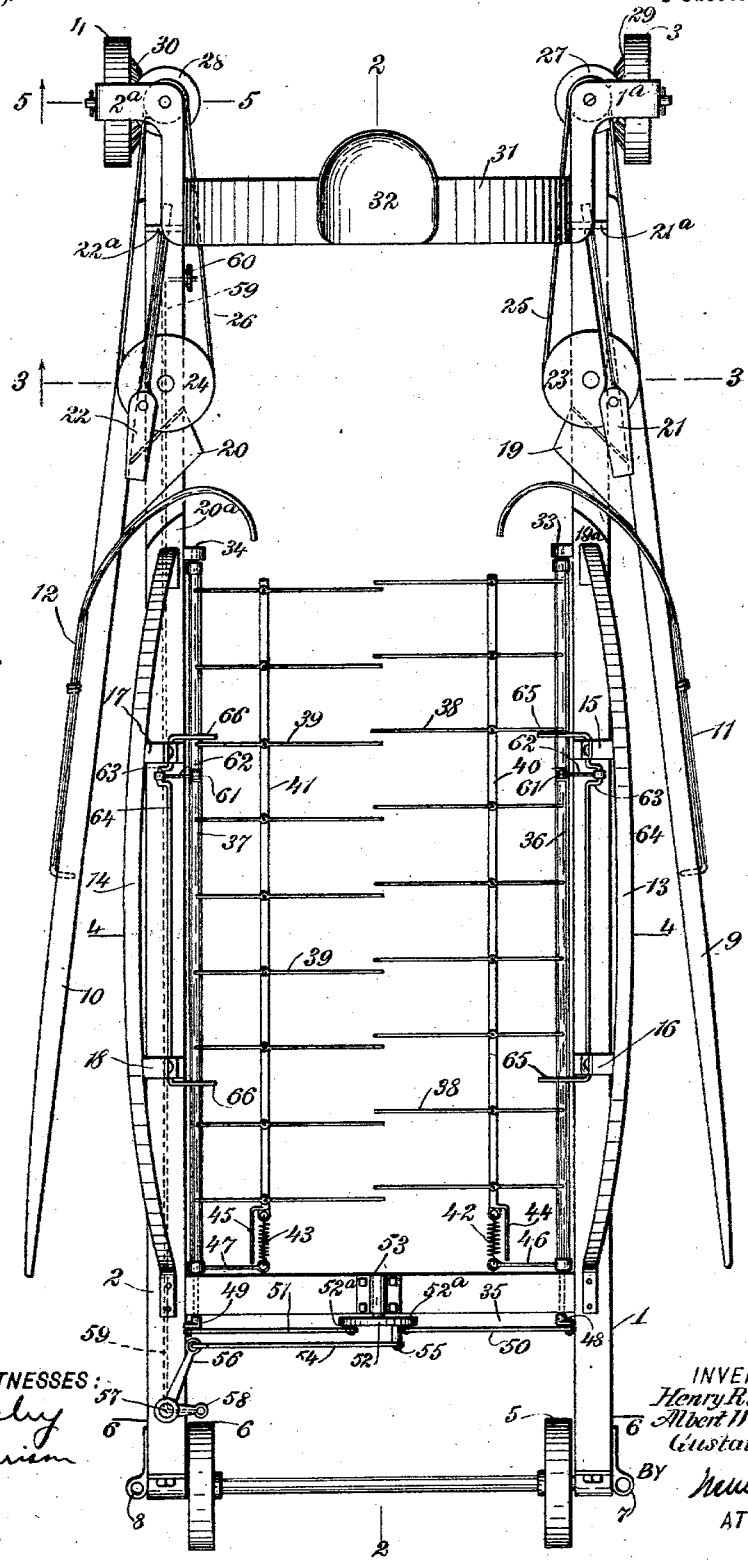

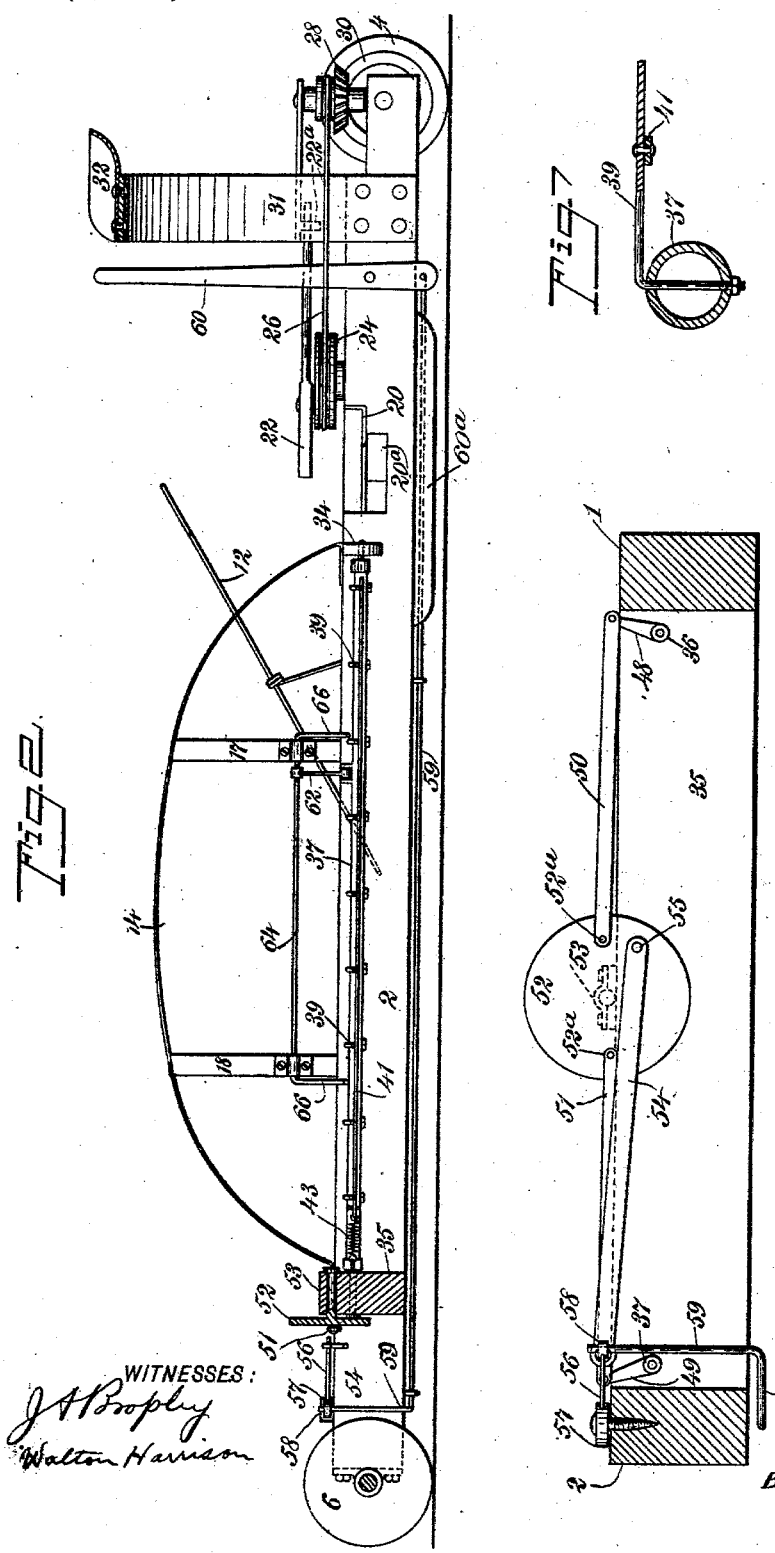

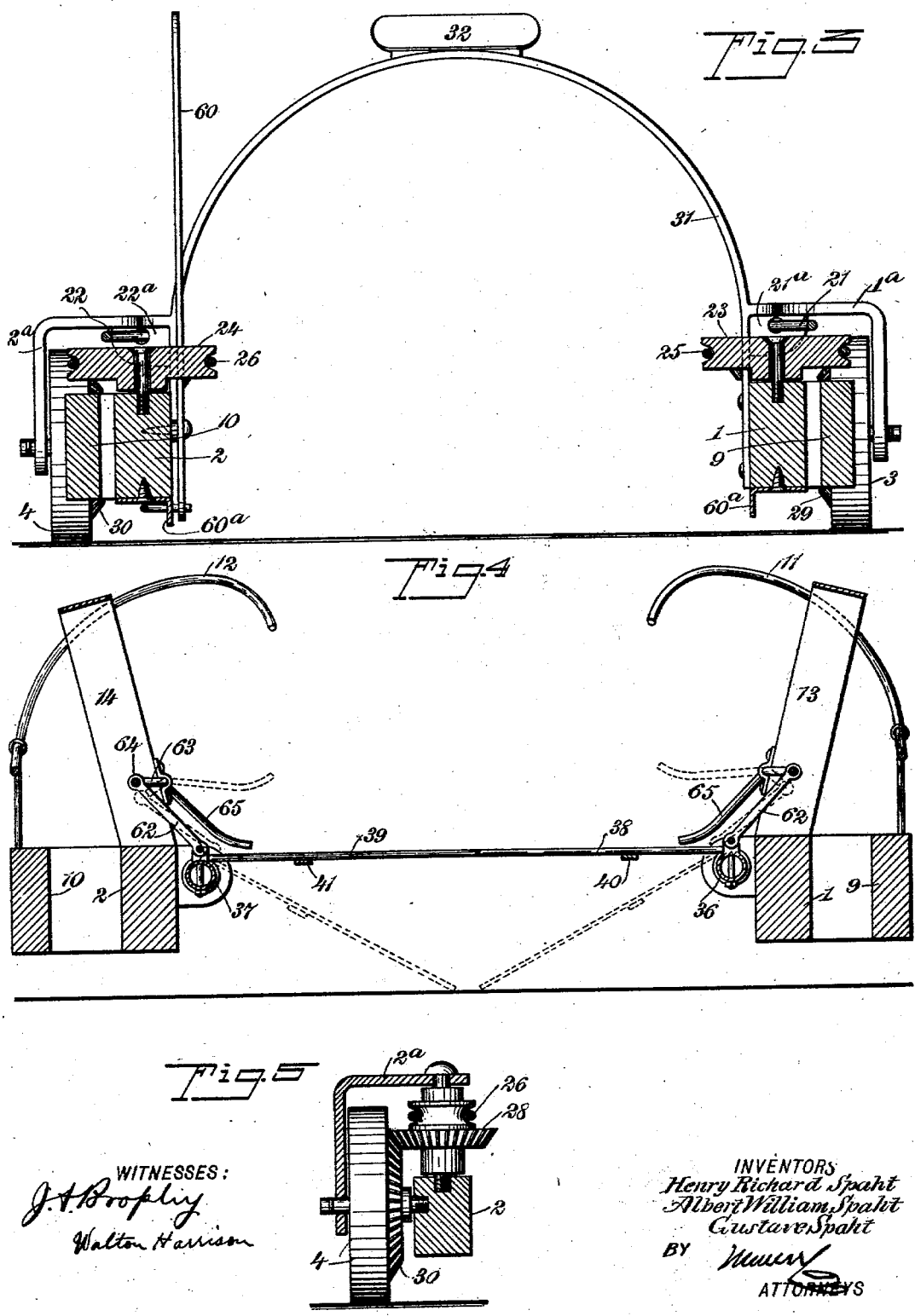

HENRY R. SPAHT AND ALBERT W. SPAHT, OF PATTONSBURG, AND GUSTAVE SPAHT, OF KING CITY, MISSOURI.

CORN-HARVESTER.

SPECIFICATION forming part of Letters Patent No. 704,947, dated July 15, 1902.

Application filed February 19, 1902. Serial No. 94,745. (No model.)

*To all whom it may concern:*

Be it known that we, HENRY RICHARD SPAHT and ALBERT WILLIAM SPAHT, residents of Pattonsburg, in the county of Daviess, and GUSTAVE SPAHT, a resident of King City, in the county of Gentry, State of Missouri, citizens of the United States, have invented new and useful Improvements in Corn-Harvesters, of which the following is a full, clear, and exact description.

The invention consists in the construction, arrangement, and combinations of parts hereinafter described, and pointed out in the appended claims.

Reference is to be had to the accompanying drawings, forming a part of this specification, in which similar characters of reference indicate corresponding parts in all the figures.

Figure 1 is a plan view of the harvester. Fig. 2 is a longitudinal central section thereof on the line 2 2 of Fig. 1. Fig. 3 is a section on the line 3 3 of Fig. 1. Fig. 4 is a vertical cross-section on the line 4 4 of Fig. 1. Fig. 5 is a sectional detail view on the line 5 5 of Fig. 1. Fig. 6 is a section on the line 6 6 of Fig. 1, and Fig. 7 is a sectional detail view showing one of the fingers of the rack.

A rectangular frame comprising side beams 1 2 is provided with wheels 3 4 5 6 and with ears 7 8 for the purpose of securing the harness-trappings of a horse thereto. Upon either side of the frame are divergent arms 9 10, provided with spring-guides 11 12 for the purpose of directing the stalks of corn against the knives and also for the purpose of guiding the fall of said stalks when severed from the ground. A pair of bows 13 14, made, preferably, of spring metal, are mounted upon the brackets 15 16 17 18. The cornstalks pile up between these bows. The knives are shown at 19 20. Immediately above the knives are the movable thrust-blades 21 22, pivoted upon the wheels 23 24 and guided by the plates $21^a$ $22^a$. The edges of the knives are disposed adjacent to the mutilations $19^a$ $20^a$ of the side beams 1 2.

Flexible cords 25 26 are used for propelling the wheels 23 24 from the wheels 27 28. The wheels 27 28 are provided with bevel-gears and are driven from the bevel-gears 29 30 as the wheels 3 and 4 are rotated upon the ground.

An arch 31 is mounted upon the side beams 1 and 2. From the lower portion of this arch spring the brackets $1^a$ $2^a$, with which the wheels 3 and 4 are connected. The seat 32, normally occupied by the driver, is mounted on the arch 31. Brackets 33 34 are disposed upon the side beams 1 and 2, and upon these brackets, together with the brace 35, are mounted the two tubular rocking members 36 37. Mounted upon these tubular members are the two rows of fingers 38 39, which are flexibly connected together by means of rods 40 41. The fingers 38 39 are normally free to swing backward relatively to the tubular members 36 37 when said fingers are dragged upon the ground and when released from the ground are automatically drawn forward by means of springs 42 43. The rods are provided with brackets 44 45, disposed adjacent to the springs 42 43 and adapted to engage the arms 46 47. The arrangement is such that when the springs 42 43 draw the arms 40 41 forward the brackets 44 45 engage the arms 46 47, these arms thus serving as stops for limiting the forward movement of said brackets.

Upon the brace 35 are crank members 48 49, and from these crank members pitmen 50 51 extend and are connected with crank-pins $52^a$ upon the rocking disk 52. Upon this rocking disk is another crank-pin 55, which is connected by a pitman 54 with the bell-crank 56. This bell-crank is pivoted at 57, and its free end 58 is connected with the longitudinal rod 59, which extends practically throughout the entire length of the frame and is connected with the hand-lever 60. The object of this arrangement is to enable the driver by manipulating the lever 60 to rock the disk 52, and thereby actuate the racks composed of the fingers 38 39 and rods 40 41, all of which are mounted upon the tubular rocking members 36 37, so that the racks are actuated as units. The fingers 38 39 are normally free to move radially in vertical planes when the lever 60 is actuated by hand. When, however, the racks are in their lowermost positions, the fingers drag upon the ground and are free to incline obliquely backward in discharging the load of cornstalks lying upon them. As soon, however, as the cornstalks are discharged and the machine has moved forward sufficiently to clear the fingers from the ground and from the cornstalks the springs 42 43 by retracting the rods 40 41 cause the fingers 38 39 to resume their normal position at right angles to the tubular members 36 37.

Upon the brackets 15 16 17 18 are pivotally mounted the auxiliary racks, comprising hooks 65 66 and shafts 64 64, upon which the hooks are integrally formed. These auxiliary racks are actuated by means of links 62, which engage the cranks 63, also formed integrally upon the shafts 64. The rocking pins 61 are mounted upon the tubular members 36 37 and engage the links for the purpose of actuating the same.

The operation of our device is as follows: One horse is preferably employed, and the machine is drawn between two adjacent rows of corn, so as to sever the cornstalks disposed upon both sides of the machine. The divergent arms 9 10 guide the stalks to the knives 19 20, the spring-arms 11 12 serving to direct the stalks when severed so that they will fall between the bows 13 14 as near parallel with the general position of the machine as possible. The members 21 22 by rapidly and actively engaging the lower ends of the stalks serve to trip the same and to some extent guide the fall of the stalks between the bows. The tendency of the stalks when severed is to pile centrally between the bows and to accumulate in groups, resting upon the racks. If now the driver pulls the lever 60, the racks are dumped—that is to say, the ends of the fingers descend to the ground and as the fingers trail backward the cornstalks are released from the machine. As a few stalks of corn may be cut during the interval while the racks are being dumped, the stalks in question are thrown forward upon the hooks 65 66, which are connected, by means of links 62, with the pins 61, said pins rocking with the tubular members 36 37. The links 63 cause the hooks 65 66 to rock simultaneously with the rocking of the racks. The hooks 65 66 therefore act as auxiliary racks and tentatively hold the few stalks of corn that may be cut while the main racks are being dumped. The restoration of the main racks to their normal position causes the dumping of the auxiliary racks, so that the practical effect is that the few stalks accumulated in the auxiliary racks are dumped in the main racks immediately after the main racks have dumped their load upon the ground. The plates 60ᵃ are shown in Figs. 2 and 3 for the purpose of strengthening the side beams.

Ordinarily the friction of the several working parts is sufficient to normally maintain the main racks in a substantially horizontal position under a light load of cornstalks. As the driver handles the lever almost constantly, however, and is so seated that he can rest one of his feet against the lever, if desired, he can correct the position of the racks at any moment and hold them at a desired level. However, we do not limit ourselves to this particular means for holding the racks horizontal. They can be so held by any other means.

This harvester is simple and cheap and requires but a minimum of labor in its operation.

Having thus described our invention, we claim as new and desire to secure by Letters Patent—

1. A corn-harvester comprising a movable frame adapted to travel between rows of corn and provided with an arch for supporting a seat, means for severing stalks located upon both sides of said frame and for guiding the fall of said stalks, racks loosely mounted upon said frame and forming a tentative support disposed centrally thereof, said racks comprising fingers normally free to move radially downward for the purpose of dumping said stalks centrally of said frame and free to swing obliquely backward when engaged by the ground, means controllable at will for swinging said fingers radially downward, and means for automatically moving said fingers forward when the same are free from the ground.

2. A corn-harvester comprising a movable frame adapted to travel between corn-rows and provided with an arch for supporting a seat, means for severing cornstalks located upon both sides of said frame, and for guiding the fall of said stalks when severed, racks loosely mounted upon said frame and forming a tentative support disposed centrally thereof, said racks comprising fingers normally free to move radially downward for the purpose of dumping said stalks centrally of said frame, and free to swing obliquely backward when engaged by the ground, mechanism controllable at will for swinging said fingers radially downward, and means for automatically moving said fingers forward when the same are free from the ground, hooks for tentatively holding any stalks which may be severed while the racks are dumping, and links connected with said racks and said hooks for actuating said hooks.

In testimony whereof we have signed our names to this specification in the presence of two subscribing witnesses.

HENRY R. SPAHT.
ALBERT W. SPAHT.
GUSTAVE SPAHT.

Witnesses:
JOHN A. SHOWEN,
H. W. CHANNELL.